United States Patent
Sundaram et al.

(10) Patent No.: US 9,634,488 B2
(45) Date of Patent: Apr. 25, 2017

(54) LOAD SCHEDULING OPTIMIZATION IN DISTRIBUTED SYSTEM

(75) Inventors: Senthil Kumar Sundaram, Bangalore (IN); Gopinath Selvaraj, Madurai (IN); Rohini Suresh Kundanagar, Bijapur (IN); Venkateswaran Narayanan, Bangalore (IN)

(73) Assignee: ABB Schweiz AG, Baden (CH)

( * ) Notice: Subject to any disclaimer, the term of this patent is extended or adjusted under 35 U.S.C. 154(b) by 1175 days.

(21) Appl. No.: 13/380,712

(22) PCT Filed: May 12, 2010

(86) PCT No.: PCT/IB2010/001085
§ 371 (c)(1),
(2), (4) Date: Dec. 23, 2011

(87) PCT Pub. No.: WO2010/150059
PCT Pub. Date: Dec. 29, 2010

(65) Prior Publication Data
US 2012/0109400 A1    May 3, 2012

(30) Foreign Application Priority Data
Jun. 26, 2009 (IN) .......................... 1502/CHE/2009

(51) Int. Cl.
*H02J 3/14* (2006.01)
*H02J 13/00* (2006.01)
*H02J 3/00* (2006.01)

(52) U.S. Cl.
CPC ............ *H02J 3/14* (2013.01); *H02J 13/0072* (2013.01); *H02J 13/0079* (2013.01);
(Continued)

(58) Field of Classification Search
CPC ...... H02J 3/14; H02J 13/0072; H02J 13/0079; H02J 2003/146; H02J 2003/007; Y04S 20/224; Y04S 20/222; Y02B 70/3225
See application file for complete search history.

(56) References Cited

U.S. PATENT DOCUMENTS 5,572,438 A * 11/1996 Ehlers ................. G01R 21/133
307/37
6,681,155 B1 * 1/2004 Fujita et al. ................. 700/287
(Continued)

FOREIGN PATENT DOCUMENTS

| WO | WO 01/01542 A1 | 1/2001 |
| WO | WO 2005/040992 A2 | 5/2005 |
| WO | WO 2009/072985 A1 | 6/2009 |

OTHER PUBLICATIONS

International Search Report (PCT/ISA/210) issued on Sep. 28, 2010, by Japanese Patent Office as the International Searching Authority for International Application No. PCT/IB2010/001085.

*Primary Examiner* — Christopher E Everett
(74) *Attorney, Agent, or Firm* — Barnes & Thornburg LLP (57) ABSTRACT

A power distribution management system is disclosed for optimal power distribution for a predetermined class of loads and other loads. The power distribution management system include a substation for distributing power supply to a load network, where the load network includes the predetermined class of loads and other loads and the substation includes a plurality of feeders. The power distribution management system includes an optimizer for generating an optimal load schedule for a control period for the predetermined class of loads. The power distribution management system also includes a communication interface for communicating between the plurality of individual loads and/or the optimizer.

13 Claims, 4 Drawing Sheets

(52) U.S. Cl.
CPC ... *H02J 2003/007* (2013.01); *H02J 2003/146* (2013.01); *Y02B 70/3225* (2013.01); *Y04S 20/222* (2013.01); *Y04S 20/224* (2013.01)

(56) References Cited

U.S. PATENT DOCUMENTS

| | | | | |
|---|---|---|---|---|
| 7,089,190 | B2* | 8/2006 | Tsui | G06Q 10/06 705/63 |
| 7,149,605 | B2* | 12/2006 | Chassin et al. | 700/295 |
| 7,356,384 | B2* | 4/2008 | Gull et al. | 700/295 |
| 7,373,222 | B1* | 5/2008 | Wright | H02J 3/14 700/20 |
| 7,778,940 | B2* | 8/2010 | Mazzarella | G06Q 30/018 705/412 |
| 2003/0020333 | A1* | 1/2003 | Ying | H01H 61/02 307/38 |
| 2003/0041039 | A1* | 2/2003 | Spool et al. | 705/412 |
| 2003/0139939 | A1* | 7/2003 | Spool et al. | 705/1 |
| 2003/0187550 | A1* | 10/2003 | Wilson et al. | 700/295 |
| 2004/0133314 | A1* | 7/2004 | Ehlers | F24F 11/0012 700/276 |
| 2005/0055137 | A1* | 3/2005 | Andren et al. | 700/291 |
| 2005/0234600 | A1* | 10/2005 | Boucher et al. | 700/286 |
| 2006/0018069 | A1* | 1/2006 | Gull et al. | 361/90 |
| 2006/0072262 | A1* | 4/2006 | Paik | H02J 3/14 361/62 |
| 2006/0208742 | A1* | 9/2006 | Tsudaka et al. | 324/532 |
| 2008/0167756 | A1* | 7/2008 | Golden | G05B 15/02 700/297 |
| 2009/0240381 | A1* | 9/2009 | Lane | 700/296 |
| 2009/0281674 | A1* | 11/2009 | Taft | 700/286 |
| 2010/0100253 | A1* | 4/2010 | Fausak et al. | 700/295 |

* cited by examiner

LOAD SCHEDULING OPTIMIZATION IN DISTRIBUTED SYSTEM

TECHNICAL FIELD

The invention relates to a method and system for power distribution optimization, and more specifically to a method and system for generating optimal load schedules for a given class of loads.

BACKGROUND

In the field of power management, distribution of available power to different loads is a critical exercise. The power demand and power supply mismatch leads to ineffective load scheduling and situations of unscheduled power cuts for several hours to reduce the peak demand at a particular time interval during a day. The power demands by different power users, like commercial and residential users in cities, agricultural, residential users in rural areas, industrial users, are different and for proper power management their different power demands have to be addressed and effectively managed.

The power system comprises of one or more of generation system, transmission system and distribution system. The power generated is usually stepped-up and transmitted through the transmission system, and at the distribution end, one or more substation systems along with the low voltage or medium voltage distribution network, distribute power to the users. For distribution, the power system has numerous automation products e.g. products for substation management/automation performing power balance and load shedding, distribution network management system for optimally distributing the power in the distribution network etc. In the context of this invention, a distribution management system (DMS) is defined for managing power distribution to the users and the scope of such a distribution system includes substation as well as distribution networks management systems. Further, the distribution management system (DMS) is also referred to as power distribution management system (PDMS).

In some cases, a dedicated feeder may be utilized for a class of loads (e.g. irrigation loads) and these may be well separated from the other feeders allowing greater flexibility in power management. As the demand for power is constantly increasing with a need to include and service more and more number of loads, the capacity of such a feeder or the equipments in the distribution network may become a constrain, requiring scheduling of loads also within a particular feeder system to ensure good utilization of the infrastructure and provide effective service to all.

In some situations the power for agricultural needs are also supplied by the same feeder delivering power for residential needs, particularly in rural or remote locations and hence, there may be interactions leading to overloading of the distribution network or affect of load shedding. For example, in rural areas, in some developing countries power cut-off exists for 10-12 hrs to accommodate power demand of other loads. In such a situation, farmers are inclined to run the irrigation pump sets beyond the stipulated hours for saving their crops with the season coming to a close and with the water-table falling at some places. Several irrigation pumps in a certain zone may draw power at the same time which results in over-loading of the power system. This causes a cascading effect and leads to a sudden increase of power demand steeply, which in turn results in more power cuts in rural areas. There may be several other non-efficient ways that a deprived power user may resort to in order to some-how get electricity. For example, evening hours in rural areas are supplied with single phase power. The farmers use converters that allow pumpsets to operate on single-phase power that result in frequent pump burnout because of high currents. Due to frequency of pump burnout, farmers rely on use of locally manufactured pump which are categorized as inefficient pumps, instead of standard certified pumps drawing more power and causing further imbalance in distribution network, overloading of the distribution transformer, and hence degradation of quality of power supply.

Similar situations are there for each segment of power users like residential, commercial, and industrial users.

The power management system operating at distribution level often transfers a load from one feeder to another to optimally utilize the capacity in the various sections of the distribution network and have a good balance of the loads in the various sections of the distribution network. However, today power management system at distribution level does not influence or does not consider the dynamic conditions of loads that are connected either automatically (includes loads that are systematically operated based on a schedule) or switched manually (operated in ad-hoc manner) in its calculation for load balanced state or configuration of loads.

In some of the current approaches for power demand management, for example, in the irrigation sector, local control systems are used that take inputs of soil condition to generate a schedule for the associated irrigation pump. The different irrigation pumps are assigned priorities and based on power demand and available capacity the power distribution is done according to prioritized schedules. In another approach, some devices are selected as controlled devices, and energy consumed by such devices like a refrigerator, electric water heater, well pumps, is measured, and during peak load times, energy to such devices is cut off and the consumer is given a rebate based on energy saved. None of these approaches provide an integrated solution of optimizing load schedules and optimizing a match between power demand and available power at the power distribution level.

Therefore there is a need for a technique that will enable optimal load scheduling integrated within the power distribution management systems, so that the power demand for any segment of power user is effectively managed.

BRIEF DESCRIPTION

According to one aspect of the invention, a power distribution management system for optimal power distribution for the predetermined class of loads and other loads is disclosed. The power distribution management system includes a substation for distributing power supply to a load network, where the load network includes the predetermined class of loads and other loads and the substation includes a plurality of feeders. The power distribution management system includes an optimizer for generating an optimal load schedule for a control period for the predetermined class of loads. The power distribution management system also includes a communication interface for communicating between the plurality of individual loads and/or the optimizer.

According to another aspect of the invention, a method for generating an optimal load schedule for a predetermined class of loads is described. The method includes a step for receiving information for power supply quota (power allowance) for predetermined class of loads for a control period; receiving information for power demand by individual loads of the predetermined class of loads; deriving an optimized power distribution solution for the power supply quota for the predetermined class of loads using the power demand by individual loads; generating the optimal load schedule for individual loads in the predetermined class of loads; and managing a plurality of feeders for power distribution to the predetermined class of loads and other loads by using the optimal load schedule.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The system and method described herein includes an optimal load scheduling technique for any selected power user segment. The selected power user segment for which the load scheduling is being optimized is referred herein as a "pre-determined class of loads". These pre-determined class of loads are typically dynamic but deterministic in nature, i.e. the load requirements are changing with time but these changes can be determined in advance or/and controlled with a schedule/plan. Further, there may be a stipulated quota of power supply i.e. a pre-determined power supply over a given period of time, assigned to the pre-determined class of loads. The exemplary pre-determined class of loads discussed herein is irrigation loads, however, any other class of loads having the similar characteristics are equally applicable. The loads except the pre-determined class of loads are referred herein as 'other loads'.

Figure 1:
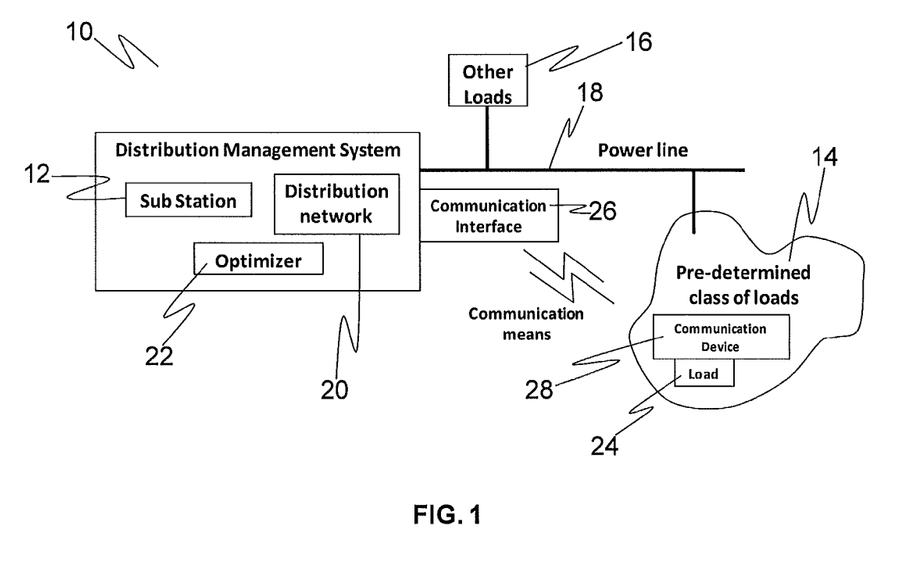
FIG. 1 is a block diagram representation of a power distribution management system (PDMS/DMS) that uses the optimizer of the invention for optimal load scheduling for predetermined class of loads.

FIG. 1 shows a typical power distribution management system (PDMS/DMS) 10 for distributing electrical power from a substation 12 to the different loads 14, 16 through a power transmission line 18. The different loads include the pre-determined class of loads 14, for example, irrigation loads, and other loads 16. The substation 12 supplies power to these other loads based on their assigned priority levels through feeders (not shown). "Feeder" as used herein includes a dedicated feeder or a dedicated transformer unit/local generator unit acting as a feeder to supply power for the predetermined class of loads and other loads. The power distribution management system of FIG. 1 includes a power distribution network management system 20, that include a substation management system. An optimizer 22 is also depicted in FIG. 1 and the optimizer 22 is used for the optimal power scheduling for the loads 24 in the pre-determined class of loads. The DMS also includes a suitable communication interface 26 (e.g. an interface for wireless cellular communication), that is used for the communication between the pre-determined class of loads though one or more communication devices 28 and the DMS. For example, the communication interface may provide information about the schedule to the individual pump set or receive information about the power demand for a specific pump set. The communication interface may include information storage, archival and retrieval modules, the contents of which are used by the power distribution network management system or any other distribution management system for power balance calculations.

The power supply from the substation for both the pre-determined class of loads and other loads as mentioned herein above is based on the power balance equation defined as, $$P_T - P_{CL} = P_{OL}$$

Where, $P_T$ is the total power available at substation, $P_{CL}$ is the power committed to the pre-determined class of loads, referred herein as power supply quota/power allowance, and $P_{OL}$ is the power available for other loads Since the power committed to the pre-determined class of loads is pre-decided and hence deterministic, the power availability for the other loads is also deterministic. The power available for the other loads may be managed based on their priority levels as practiced today by a dedicated substation for the other loads.

Within the overall system as described in FIG. 1, one aspect of the invention includes determining an optimal load schedule for the pre-determined class of loads by using the optimizer. Typically, the optimal load schedule is created apriori, at least a couple of hours in advance and preferably a day in advance for a given control period.

In the exemplary embodiment, the predetermined class of loads are registered at the power distribution network level, or at the substation level or at DMS level. The process of registration includes collection and storage of load information like individual load details (type of power supply (1 phase/3 phase)) and rating of the individual loads (e.g., load-1 with 3 hp (horse power) motor, load-2 with 5 hp motor)), and other information like, the type of communication interface (e.g. information regarding the mode of communication (SMS/Wi-fi/manual/wired/IP based)) between the individual loads to the optimizer, specific IP address information for individual loads belongs to the pre-determined class of loads, and other such information for assigning an identity to each individual load. The information registered defines the type and rating of load, communication means and any other information that is useful to provide service (power or any other value added service or preferred treatment).

After the registration process, the individual loads communicate their power demand requirements and the power utilization status to DMS at periodic intervals. This information includes, total time for the power required (e.g., 5 hrs for individual load-1, 8 hrs for individual load-2), specific time instant (e.g., from 2:00 PM to 4:00 PM on a specific day), satisfaction index to fulfill the need (e.g., at least 80% of the total time of power required to be supplied to the load) to the optimizer, flexibility for use of higher tariff power (say from the other load) etc. The information communicated are related to the power needs, any specific requests or approvals related with meeting the power need, cost/tariff related information for preferred treatment or value added services. Example of preferred treatment includes provisions of special tariffs based on subscriptions at specific hours, loyalty programs or higher priority for scheduling etc. Example of value added services are automatic metering and billing, automatic operation of the load from the DMS, community benefits resulting from loads sharing similar concerns, associations based on end use (similar type of crops) etc.

Figure 2:
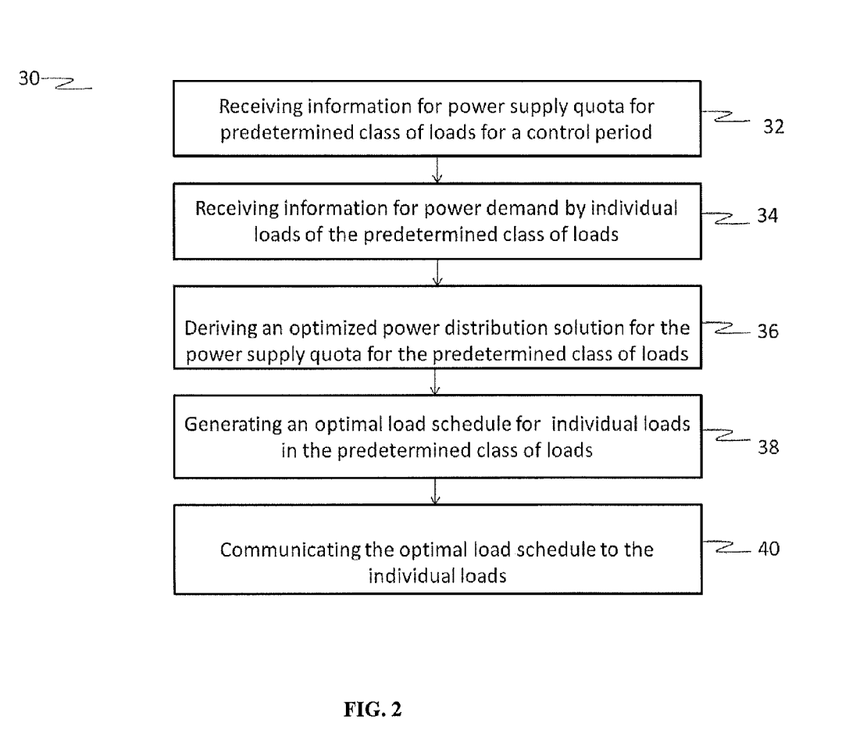
FIG. 2 is a flowchart representation of exemplary steps for a method of optimizing a power supply quota for a predetermined class of loads and generating an optimal load schedule.

FIG. 2 is a flowchart representation 30 of exemplary steps for a method of optimizing a power supply quota for a predetermined class of loads and generating an optimal load schedule by the optimizer. The optimizer uses the information of the power supply quota for the pre-determined class of loads and available information from the pre-determined class of loads as shown at step 32 and 34 respectively. The optimizer derives an optimal power distribution solution for the power supply quota for the predetermined class of loads as shown at step 36 (and explained herein below in reference to the description of the objective function). The optimizer then generates the optimal load schedule for the pre-determined class of loads as indicated at step 38.

These optimized load schedules are communicated to each individual load in the pre-determined class of loads from the DMS as indicated at step 40. The communication in one example is through the communication interface module. Each individual load of the pre-determined class of loads may be equipped with a wired or wireless device capable of receiving their respective schedules for operation and may include automated means to control the load (e.g. automatically power ON and OFF as per the allotted schedule) and also send acknowledgment or feedback about consumption of power or any other specific requirements or factors that affect scheduling of power to the DMS.

In an exemplary embodiment, after communicating the optimal load schedules to the individual loads in the predetermined class of loads, in one embodiment the DMS directly implements the load schedule in the control period.

Figure 3:
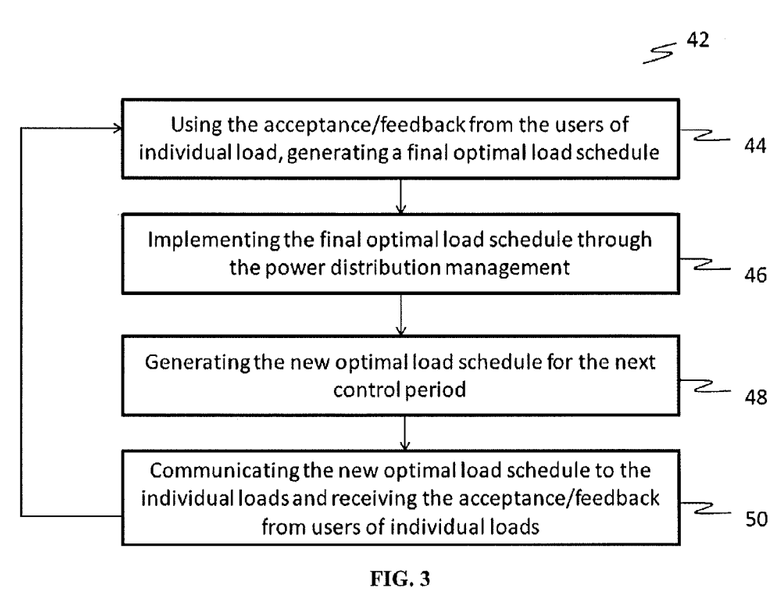
FIG. 3 is a flowchart representation of exemplary steps for implementing the optimal load schedule.

In another embodiment however, a feedback mechanism is instituted to receive an acceptance/feedback from users of the individual loads in order to generate a final load schedule. The exemplary steps for generating and implementing a final load schedule are shown in FIG. 3 through the flowchart 42. The PDMS seeks feedback from users as shown at step 44 on the optimal load schedules and the optimizer incorporates the feedback to generate a final optimal load schedule. It may be noted here that the feedback could include, any changes in power demand by individual loads or change of any other information that may impact the time and quantity of power supply to the individual loads. Once the optimal loads schedule is implemented by the DMS, the optimizer then moves to generate a new optimal load schedule for the next control period as shown at step 48, and communicates the same to individual loads as indicated at step 50. The optimizer works in cyclic manner and repeats steps 44 to 50 to continuously generate the optimal load schedules for the desired control period, taking into account any changes in power demand required by the users or the power distribution management system.

The optimizer does the optimal load scheduling with the objective of operating the pre-determined class of loads in such a way that, the power supply quota is utilized to its maximum, and at the same time overall stability of the power distribution network is also maintained i.e. the power distribution network is not over loaded. It will be appreciated by those skilled in the art that utilizing the power supply quota to its maximum limit helps in maintaining a good load factor. It is to be noted that the power supply quota may be a time varying quantity based on the factors such as power availability, power tariff and other load profiles. The optimal power scheduling as per the requirements of the pre-determined class of loads also helps the substation automation systems to efficiently manage the power supply distribution to other loads.

The optimizer as described herein, therefore has an objective function defined as the minimization of difference between the power supply quota (committed power) for the pre-determined class of loads and the power consumed by the pre-determined class of loads over a period of time. The difference is minimized by scheduling the adequate number of loads, distributed as balanced as possible in the distribution network.

The optimizer uses the following objective function (J) that minimizes the difference between the power demand and the power supply quota (power scheduled) to meet the demand of the pre-determined class of loads.

$$J = \text{minimize}(\text{Power Demand} - \text{Power scheduled}) \quad (1)$$

where, the power demand in equation (1) is calculated using the information on the total time (say in hours) of power requirements from each individual loads belongs to the pre-determined class of loads as given below in equation (2).

$$\text{Power Demand} = \sum_{l=1}^{L} (R_l * \text{total time of power required}) \quad (2)$$

where, $R_l$=Registered power rating of $l^{th}$ load belongs to the pre-determined class of load $$\text{Power scheduled} = \sum_{t=0}^{T} \sum_{l=1}^{L} (R_l * S_l(t)) \quad (3)$$

where, $S_l(t)$ is the optimal switching status (on/off) for the $l^{th}$ load over the period of time t. Switching status $S_l(t)$ can take the values either '0' for 'off' or '1' for 'on' is defined as follows.

$$S_l(t) = \begin{cases} 0 & \text{indicates that load } l \text{ is OFF at time } t \\ 1 & \text{indicates that load } l \text{ is ON at time } t \end{cases} \quad (4)$$

The optimization problem as stated in equation (1) is subjected to the following constraints:
(i) Power allowance constraint for pre-determined class of loads: At any time instance, the power scheduled to the pre-determined class of loads should not exceed the power allowance ($P_{CL}$) over the time period "t" i.e., Power scheduled≤Power allowance $$\sum_{l=1}^{L} (R_l * S_l(t)) \leq P_{CL}(t) \quad (5)$$

(ii) Total ON time constraint:
Total ON time is defined as the total time of power required by each individual load belongs to the pre-determined class of loads. For example, let us consider irrigation loads as the pre-determined class of loads requiring power for their pumps to pump water. Based on the type of crops and the geographical information such as the availability of water and rainfall, every farmer will request power for a defined period (total ON time) to run their pumps to irrigate the land. In this example, the information on the total ON time for individual loads is communicated by the individual loads to the distribution management system through a wireless system. This information is used by the optimizer as one of the constraints in finding the optimal switching schedules of power supply for irrigation loads. The total ON time constraint is defined as follows:

$$h_1 \leq H_1 \tag{6}$$

where, $H_1$ is the total time of power requested by $1^{th}$ load, $h_1$ is the sum of switching status of $1^{th}$ individual load over the period of time t and is calculated by the following equation.

$$h_l = \sum_{t=0}^{T} S_l(t) \tag{7}$$

iii) Minimum ON time constraint:

Minimum ON time defines the minimum time for which the power is to be scheduled to each individual loads. This minimum period is a subset of total ON time (H1) for each individual loads. For example a load 1 is switched ON (i.e., $S_1(t)=1$). This constraint forces the optimizer to schedule the power allowance to the $1^{th}$ load at least to the minimum ON time (minimum number of hours). The minimum ON time constraint is defined as follows:

$$X_1 \geq \min T_{ON}^1 \tag{8}$$

where, $X_1$ is a counter for the accumulation of ON time status of $1^{th}$ load. This counter will reset for changes in switching status of individual load from ON to OFF state.

$$X_l(t+1) = \begin{cases} X_l(t) + T_{step} & \text{if } S_l(t+1) = 1 \\ 0 & \text{if } S_l(t+1) = 0 \end{cases} \tag{9}$$

$$S_l(t+1) = 1 \text{ if } X_l(t) < \min T_{ON}^l \text{ and } S_l(t) = 1 \tag{10}$$

$\min T_{ON}$ is the minimum time duration for which $1^{th}$ load should be in ON state iv) In addition to the above constraints, the satisfaction index value constraints could also be considered by the optimizer for the optimal scheduling of individual loads belongs to the pre-determined class of loads.

v) Situations in which the loads under to the pre-determined class may have a time varying loads ($r_1(t)$). In such situations the optimizer may consider the time varying loads ($r_1(t)$) for the calculation of the power demand and power scheduled as defined in equations (2) & (3). In addition, it include a constraint on the time varying loads $r_l(t)$, defined as follows.

$$r_1(t) \leq R_1 \tag{11}$$

vi) Situations in which the loads belonging to the pre-determined class of loads can request for more than the power allowance ($P_{CL}$). Under such circumstances, the optimizer schedules the additional power from the power for other loads ($P_{OL}$) with the same or different tariff rates.

The tariff rates for the pre-determined class of loads and the other loads may be different.

The optimizer has optimization algorithms, capable to provide the optimal load schedule under such different scenarios based on the power supply quota as defined through an objective function with constraints. The scenarios as mentioned herein include but are not limited to time and quantity of service, tariff category (subsidized/unsubsidized), type of crop, interconnectivity of power networks, pump rating/quality, ground water level/water availability, other the environmental conditions for irrigation loads. In urban setting, the loads may be scheduled considering factors such as the load type (HVAC, lighting etc), the load user (office building, residential, hospitals, schools etc), the society needs (basic, luxury or emergency) etc.

The optimizer may be incorporated as a specific subsystem of the substation system (included in the substation automation products) or be a specific part of the distribution network system (included in the distribution network management products) or be part of both the systems, or be an independent module that interfaces with the substation system or the distribution network system.

Essentially, in another embodiment, the optimizer at the substation level in addition to scheduling the loads in the pre-determined class of loads, will also ensure that at least one feeder associated with the pre-determined class of loads is always available and is not load shed based on power management conditions in the load shed controllers. In occasions (rare), where load shed is inevitable, the optimizer needs to account of unavailability of power and make adjustments (reschedule) in allocation of power for the loads in the pre-determined class of loads.

As can be inferred that in normal operations, the load shedding operation takes place only for the other loads based on the priority definitions (pre-defined priorities) associated with the other loads and for the loads in the pre-determined class of loads, the optimizer decides operation of the individual loads and these are managed as per the schedule devised accounting the power committed (power quota) for the pre-determined class of loads.

Figure 4:
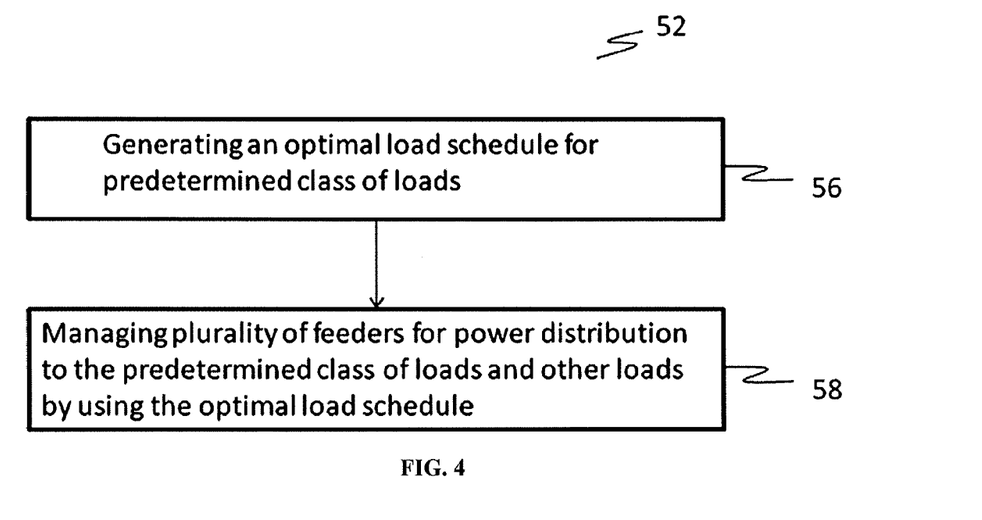
FIG. 4 is a flowchart representation of exemplary steps for using the optimal load schedule by the power distribution management system for managing power supply from one or more feeders.

The management system for the distribution network may additionally or exclusively host the optimizer for load scheduling of the loads in the pre-determined class of loads. FIG. 4 shows a flowchart representation 52 that captures this aspect of the invention that uses the optimal load schedule for pre-determined class of loads as indicated at step 56. As stated earlier that such a management system attempts to have real time reconfiguration of feeders such that power utilization is maximized and power balance is maintained in the distribution network by optimally operating the switches that connects various feeders/loads to the distribution system. Here, the optimization program used for reconfiguration of feeders/loads need to be aware of the loads that are scheduled at a particular period of time so that at no time such loads that are scheduled by the optimizer associated with the pre-determined class of loads are affected (minimally affected) by any operation related to reconfiguration of feeders/loads as indicated at step 58. Such requirements may be specified as constraint for optimization of reconfiguration or suitably included in the objective function related with reconfiguration.

As stated before, the optimizer for scheduling loads within the pre-determined class of loads may also be part of any other system or in a specific embodiment maybe a stand-alone independent module that may have an information exchange interface to communicate with the substation system or the management system for the power distribution network or any automation system used for power distribution management to share information about scheduling and also receive information about any unavailability of power or unsuccessful/partial operation of the loads within the pre-determined class of loads to the purpose of re-estimation or rescheduling the loads or reconfiguring of the feeders for power distribution and power balance calculations. It is to be noted that any re-estimation or rescheduling for a particular load may involve provision of increased priority or other preferential treatment provided directly the optimizer system or requested from the distribution/substation system.

While only certain features of the invention have been illustrated and described herein, many modifications and changes will occur to those skilled in the art. The invention though describes only the aspect of meeting power requirements by optimally scheduling the loads, the system may be useful for many other purposes as example eliminating power thefts. It is, therefore, to be understood that the appended claims are intended to cover all such modifications and changes as fall within the true spirit of the invention.

We claim:

1. A power distribution management system for managing distribution of electrical power in a distribution network including a predetermined class of loads and other loads, the power distribution management system comprising:
   a substation including a plurality of feeders for distributing power to the predetermined class of loads and to the other loads, wherein the predetermined class of loads communicates with the power distribution management system through one or more communication devices;
   an optimizer for generating a priori an optimal load schedule of individual loads of the predetermined class of loads, wherein the optimal load schedule is derived using an objective function with constraints that minimizes a difference between a power supply quota for the predetermined class of loads and power consumed by the predetermined class of loads over a period of time, wherein the power supply quota is power committed for the predetermined class of loads from total power available for distribution to the predetermined class of loads and to the other loads, wherein the difference between the power supply quota and the power consumed is minimized by scheduling an adequate number of individual loads from the predetermined class of loads according to a power demand of the individual loads of the predetermined class of loads, and wherein the constraints include at least one of (i) a total ON time constraint indicative of a total time of power required by each individual load of the predetermined class of loads, and (ii) a minimum ON time constraint indicative of a minimum time for which power is to be scheduled to each individual load of the predetermined class of loads; and
   a communication interface for communication with at least one of the individual loads and the optimizer, wherein the optimal load schedule is communicated to the individual loads through the communication interface,
   wherein the power distribution management system is for managing the individual loads of the predetermined class of loads, the distribution network, and the plurality of feeders based on the optimal load schedule.

2. The power distribution management system of claim 1, wherein at least one individual load from the predetermined class of loads is operated by the power distribution management system based on the optimal load schedule.

3. The power distribution management system of claim 1, wherein the constraints further include a power allowance constraint, and a time varying load constraint.

4. The power distribution management system of claim 1, wherein the optimizer is integral to at least one of a power distribution network management system, a substation management system in the substation, or both the power distribution network management system and a substation management system.

5. The power distribution management system of claim 1, wherein the communication interface is for registering identity information of the individual loads from the predetermined class of loads.

6. The power distribution management system of claim 5, wherein the identity information of the individual loads comprises:
   at least information on a type and rating of an individual load and information on the communication device.

7. The power distribution management system of claim 1, wherein the optimizer is configured to ensure that at least one feeder associated with the predetermined class of loads is always available to supply power to the predetermined class of loads.

8. The power distribution management system of claim 1, wherein the power distribution management system is for receiving at least one of identity information, power requirement information, power utilized information, or a combination thereof from at least one of the individual loads.

9. The power distribution management system of claim 1, wherein the power distribution management system is for sending at least one of an optimal schedule information, tariff information, information for approval, instruction to operate information, or the combination thereof to at least one of the individual loads.

10. The power distribution management system of claim 1, wherein the power distribution management system is for reconfiguring one or more feeders of the plurality of feeders based on the optimal load schedule.

11. A method for optimal power distribution to a predetermined class of loads, wherein a power distribution management system manages distribution of electrical power in a distribution network including the predetermined class of loads and other loads, the method comprising:
   receiving information of a power supply quota for the predetermined class of loads at an optimizer of the power distribution management system, wherein the power supply quota is power committed for the predetermined class of loads from total power available for distribution to the predetermined class of loads and to the other loads;
   receiving information of power demand by individual loads of the predetermined class of loads at a communication interface of the power distribution management system, wherein each individual load of the predetermined class of loads communicates with the power distribution management system through one or more communication devices;
   deriving a priori, at the optimizer, an optimal load schedule for individual loads of the predetermined class of loads with an objective function with constraints that minimizes a difference between the power supply quota for the predetermined class of loads and power consumed by the predetermined class of loads over a period of time, wherein the difference is minimized by scheduling an adequate number of individual loads from the predetermined class of loads, and wherein the constraints include at least one of (i) a total ON time constraint indicative of a total time of power required by each individual load of the predetermined class of loads, and (ii) a minimum ON time constraint indicative of a minimum time for which power is to be scheduled to each individual load of the predetermined class of loads;

communicating the optimal load schedule to the individual loads of the predetermined class of loads through the communication interface of the power distribution management system; and managing the distribution network and a plurality of feeders that distribute power to the predetermined class of loads and to the other loads based on the optimal load schedule.

12. The method for load scheduling of claim 11 comprising:

receiving feedback from respective users of the individual loads; and using the feedback from the respective users of the individual loads to generate a final optimal load schedule.

13. The method of claim 11, wherein the power distribution to the other loads is based on pre-defined priorities.

* * * * *